UNITED STATES PATENT OFFICE.

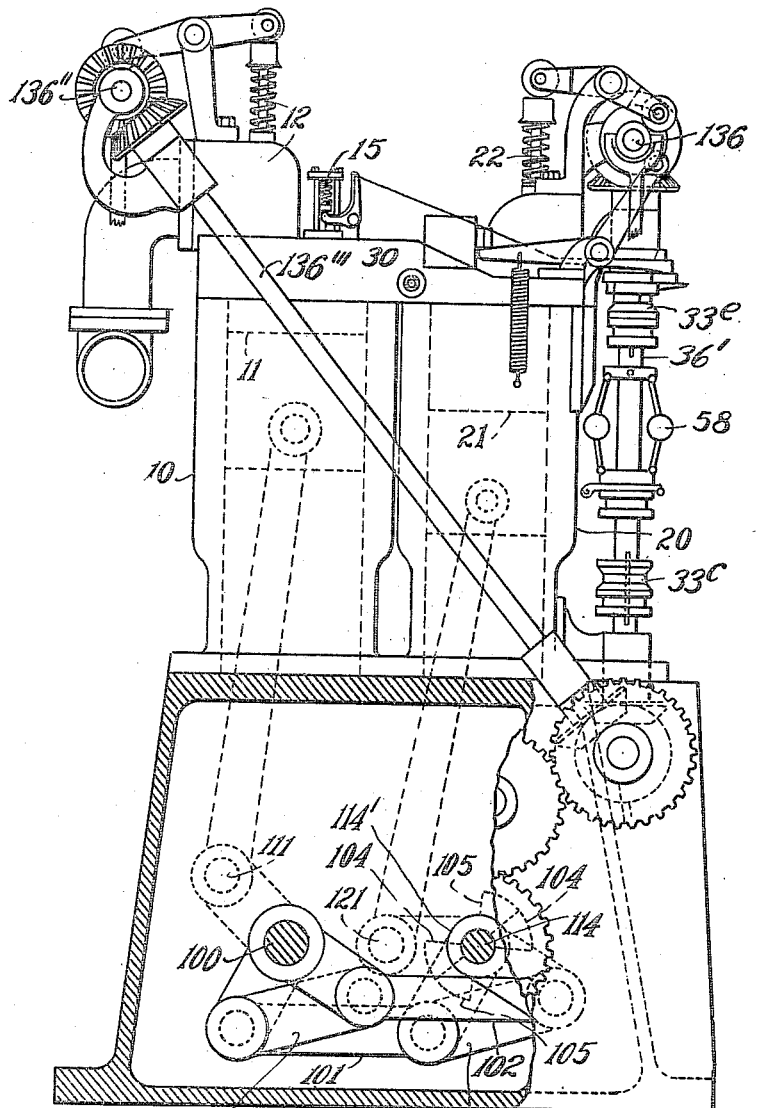

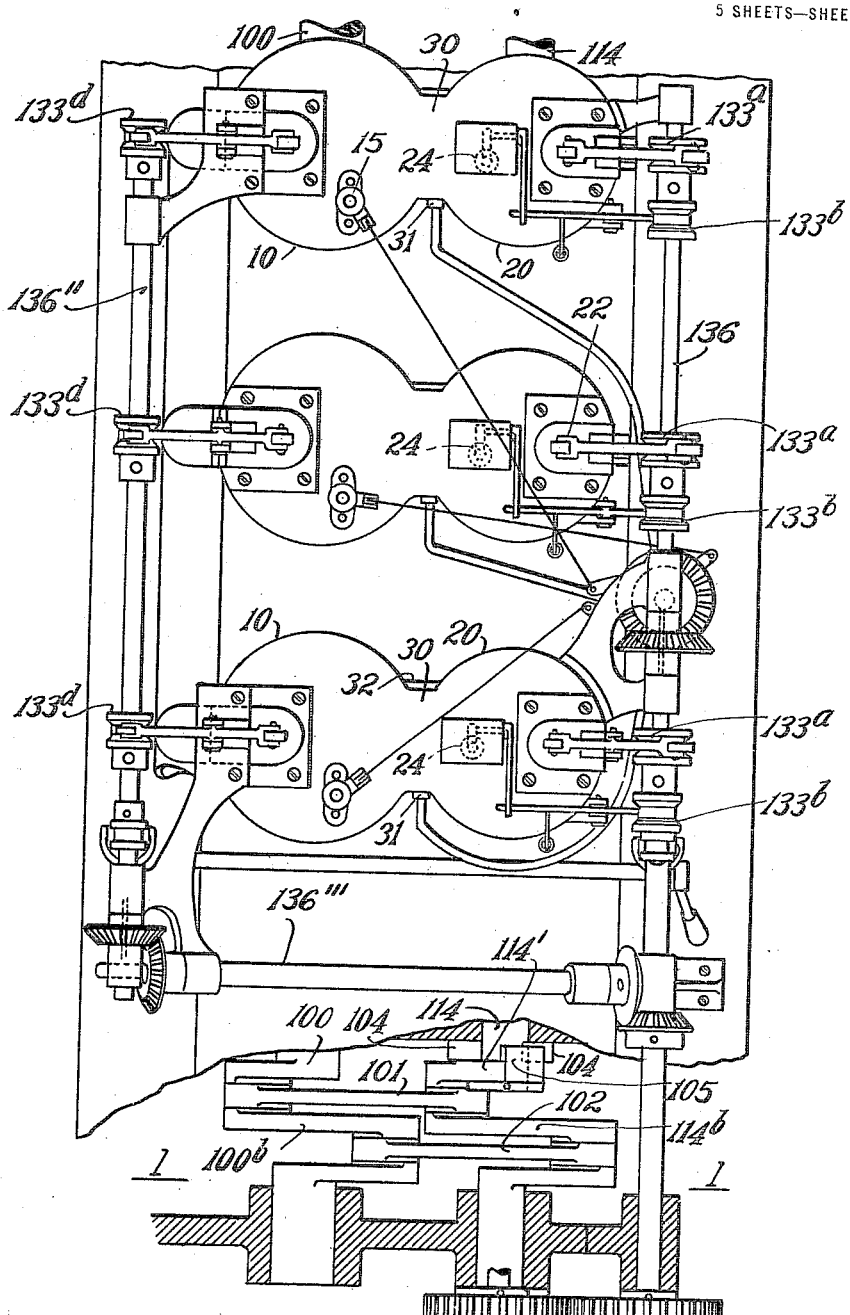

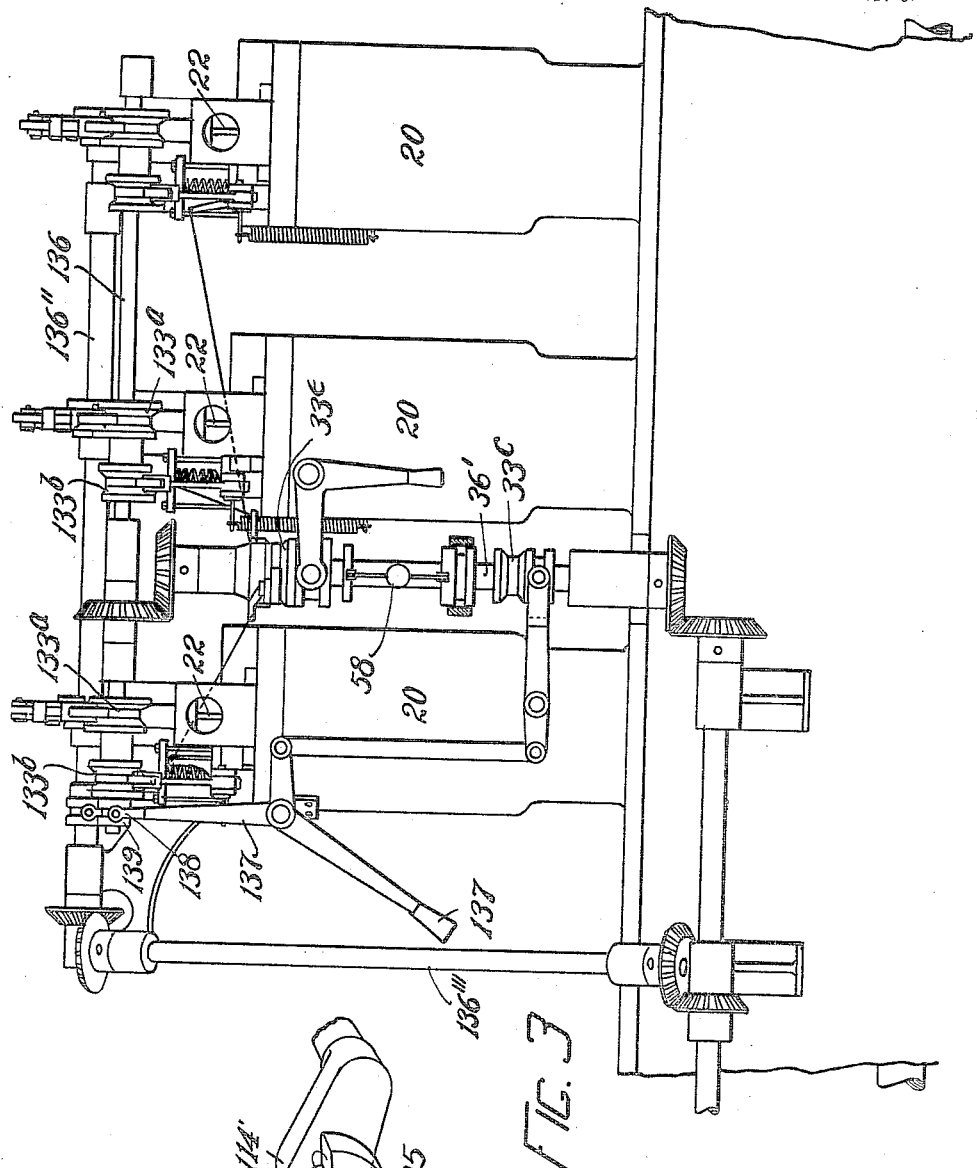

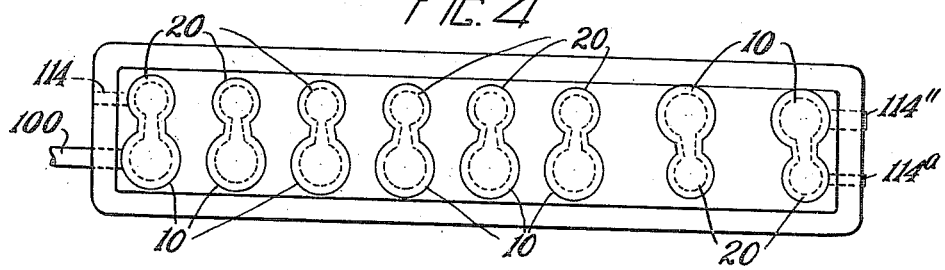
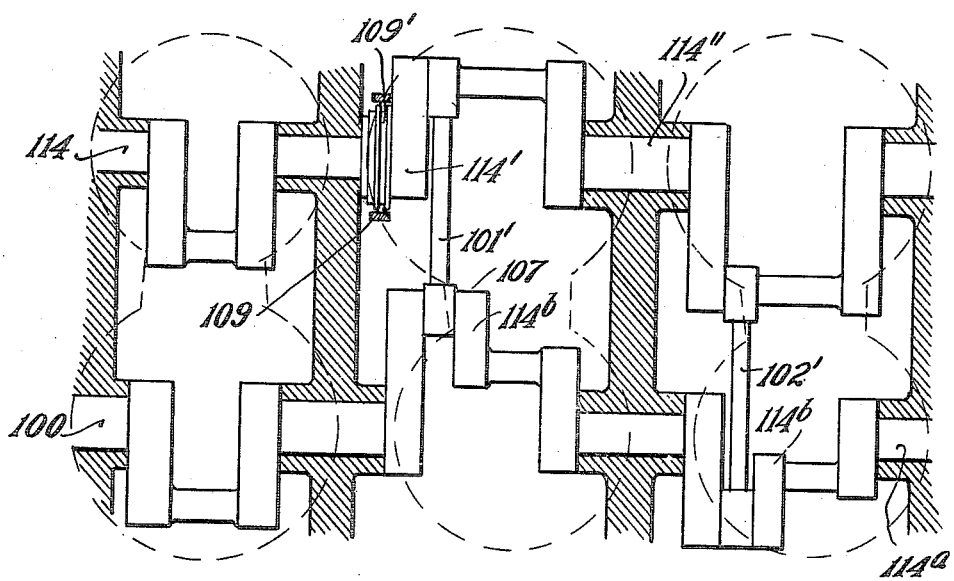

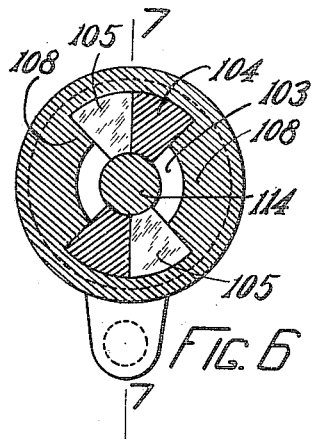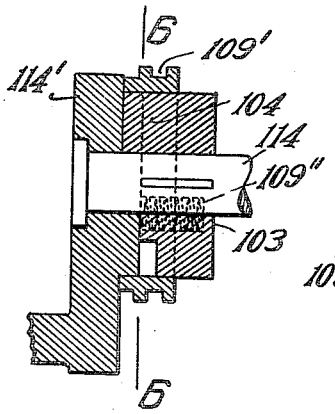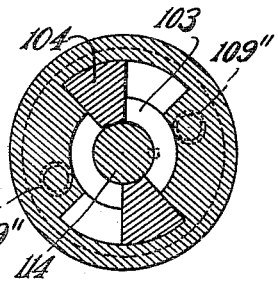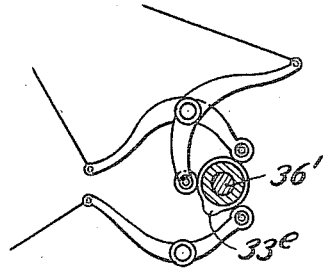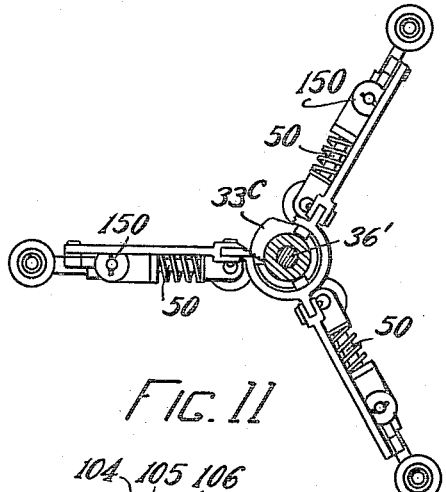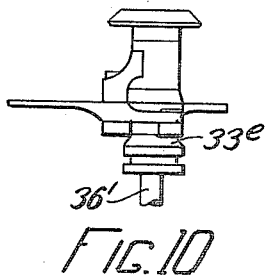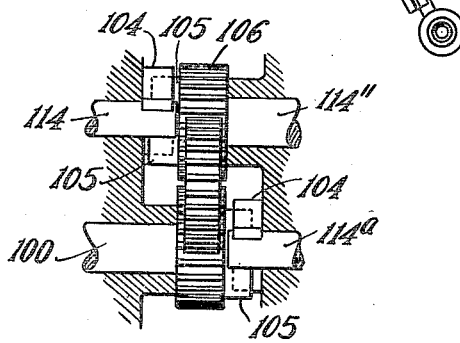

MERL R. WOLFARD, OF CAMBRIDGE, MASSACHUSETTS, ASSIGNOR OF ONE-FOURTH TO LEROY A. AMES, OF SPENCER, MASSACHUSETTS, AND ONE-FOURTH TO EVERETT E. KENT, OF NEWTON, MASSACHUSETTS.

INTERNAL-COMBUSTION ENGINE.

1,305,578.  Specification of Letters Patent.  Patented June 3, 1919.

Application filed February 17, 1915. Serial No. 8,831.

*To all whom it may concern:*

Be it known that I, MERL R. WOLFARD, a citizen of the United States, residing at Cambridge, in the county of Middlesex and State of Massachusetts, have invented new and useful Improvements in Internal-Combustion Engines, of which the following is a specification.

This invention relates to improvements in internal combustion engines, more particularly those using liquid fuel. It applies especially to engines where the contents of one cylinder go directly to another, the pistons in these two cylinders being interconnected with their cranks at an oblique angle. In my co-pending application for patent Serial No. 8828 I have disclosed my invention of such an engine, in which pure air goes from the first cylinder through a passage to the second, liquid fuel being introduced and burning while it is passing. This engine is particularly adapted to be built in very large sizes, larger in fact than any high efficiency engines, such as engines of the Diesel type, have heretofore been deemed possible of safe construction. The two cylinders can naturally be arranged with their pistons operating side by side on a common crank shaft, as is shown in my said co-pending application; but in the larger powers the mechanical necessity of providing a bearing for the main shaft on each side of each crank pin, in order to prevent undue deflection, causes a wider spacing of the cylinders than is desirable for the best thermodynamic efficiency; so wide in fact that no known commercial material would resist for any length of time the severe heat strain which would be imposed on the hotter end of a passage as long and attenuated as the clearance considerations impose. Furthermore, an engine is not reversible, if built in the form illustrated in the principal figures of said application for patent, because the air piston, which lags about 45° behind the power piston, would cease to lag, and would be in the lead if the direction of rotation were reversed. The object of the invention herein to be set forth is to provide means by which the engine of the invention disclosed in my said co-pending application for patent can be built in very large sizes without loss of efficiency for the reasons stated, and can be made so as to be quickly and easily reversible. Other objects of the invention are to provide a simple and effective means for advantageously combining a number of power units in light and compact form with high mechanical efficiency, as for example, for marine use, and in general to provide the improvements in engine construction that are characteristic of the invention herein disclosed. It is intended to cover by this patent, by suitable expression in the appended claims, whatever features of patentable novelty exist in the invention disclosed, except in so far as the same are covered by the claims finally remaining in my said co-pending application for patent Serial No. 8828 or in my other co-pending applications, to wit, Serial No. 8829 relating to the combustion chamber; Serial No. 8830 relating to the fuel injection nozzle; and Serial No. 8832 relating to the process of thermodynamic conversion on which the engine works, to all of which reference is hereby made for more detailed information, if any be necessary, as to the construction and method of operation of the engine herein illustrated.

In the accompanying drawings:

Figure 1 is an end elevation of an internal combustion engine, partly in section, on the line 1—1 of Fig. 2;

Fig. 2 is a plan of the same, with parts broken away;

Fig. 3 is a side elevation of the same;

Fig. 4 is a diagram plan of another embodiment of the invention with a different arrangement of cylinders;

Fig. 5 is a plan showing important features of the invention on a larger scale, in section, at the level of the main shaft bearings, with the relative position the cylinder would occupy, if present, shown by dotted lines;

Fig. 6 is an end elevation of a detail, showing a part of the reversing mechanism in section on the line 6—6 of Fig. 7;

Fig. 7 is a side elevation of the same detail, in section on the line 7—7 of Fig. 6;

Fig. 8 is an end elevation of the detail in section, showing the parts in a different position, the section being on the same line as Fig 6, but looking the opposite way;

Fig. 9 is a plan of a detail, the cam for operating the starting valves;

Fig. 10 is an elevation of the same;

Fig. 11 is a plan of the oil pump for supplying fuel;

Fig. 12 is a plan showing an alternate method of gearing two crank shafts together, in section, at the back of the main bearings; and Fig. 13 is a perspective view showing separated parts of one form of the lag-reversing mechanism.

The drawings (except in Figs. 4 and 5) represent an engine composed of a series of three power units, which is to be regarded as typical of an engine composed of any number of units, whose power is concentrated upon a single main shaft 100, such as a propeller shaft of a ship. Each power unit consists of a power cylinder 10 having a piston 11 and an exhaust valve 12; an air cylinder 20 having a piston 21 and an air inlet valve 22; and a chamber or passage 30 which makes a direct connection of ample cross section between the head ends of the two cylinders. This passage is permanently open into the power cylinder, but is separated from the air cylinder 20 by a mechanically controlled intermediate valve 24, near which, in the passage, is a nozzle 31 capable of projecting a stream of atomized liquid fuel into and across the passage. The passage also contains an igniting device 32 for use when the engine is starting, which is here, for the sake of simplicity, represented by a closed tube 32 which may be heated red by an external gas flame, although it should be understood that any suitable means may be substituted for obtaining ignition at the outset. The walls of the passage near the power cylinder become hot enough after the engine has been in operation, to ignite the successive charges of fuel. One or more of the power cylinders may have a starting valve 15 for admitting compressed air, with suitable controlling means and connections to put the engine initially into operation; although so far as the invention is concerned any other operating starting means may be employed.

The mechanism must be arranged so that the power piston 11 leads the air piston 21 by a suitable angle which I have found to be about 45° measured on the crank shaft. It is one feature of the invention that these two pistons of each power unit are connected to suitable cranks such as 111 and 121 which are on separate crank shafts; said crank shafts being coupled or geared together so as to rotate in unison in such manner as to remain rigidly in their angular relation to each other while operating continuously in one direction. During reversal the same angular relation must be established for the opposite direction of rotation and must be maintained. In operation the following is the cycle in each power unit: During the greater part of the power piston's inward stroke the exhaust valve 12 is open. Simultaneously with its closing, at about 40° from the end of the inward stroke, the intermediate air valve 24 opens a little, permitting air that is being compressed in the air cylinder 20 to flow into the near end of passage 30 while the gases entrapped by the closing of the exhaust valve begin to be forced into the other end of the passage, next to the power cylinder. During the completion of the inward stroke of the power piston compression is occurring in both cylinders and in the combustion passage; and as only a part of the clearance is in the power cylinder some of the gases therein are forced into the adjacent end of the combustion passage. Air is simultaneously let into the other end of the passage in sufficient quantity to balance it, so that as the compression continues the spent gases remain at the power cylinder end and the pure air remains at the air cylinder end of the passage. At a predetermined instant, which may be about 10° before the end of the power piston's stroke, action of the fuel pump 150 begins, forcing oil through the nozzle 31 into the passage 30. The nozzle atomizes and throws this oil so that it pervades the pure air in that part of the passage. At about the same time the device controlling the intermediate valve 24 allows it to open farther, so that the air preponderates and a drift begins in the combustion passage toward the power cylinder. Ignition occurs, and then combustion proceeds during the early part of the outward stroke of the power piston, the lagging air piston meanwhile continuing its inward compressing stroke, and the intermediate valve 24 permitting air compressed thereby to flow gradually into the passage in sufficient quantity to support the combustion. In the vicinity of the fuel nozzle the combustion passage is maintained at such a temperature that the atomized oil rapidly passes into vaporous form, but does not burn. Moving on with the body of air which it thoroughly pervades, it reaches a place where the passage is hot enough so that combustion occurs immediately and completely. This process continues gradually, the place of combustion being separated from the place of volatilization, which feature enables the engine to burn the heavy and less volatile oils and contributes to the high efficiency of the engine by making the combustion complete and immediate when it occurs. The products of combustion expand in the power cylinder to the end of stroke, when the exhaust valve opens. The rate of admission of air to the combustion passage is regulated in part by the opposing pressure set up by the combustion which is occurring at the head of the moving column of air, opposing the pressure of the advancing piston 21, but it can be controlled with greater accuracy and an engine can be made more flexible if an intermediate valve 24 be used as stated; and therefore the use of such a valve would naturally be contemplated in large installations or in those likely to be called upon for various duties. The system may also be modified by operating it at pressure so high that the fuel is ignited immediately upon injection, by temperature of contained gases according to the Diesel principle, although for general purposes I consider the described style of operation superior. Other details may be varied or omitted, but in general it will be seen that for efficient operation the clearance of the power cylinder, which includes the space contained in the combustion passage 30, should not in total exceed some certain amount which can be computed in each case according to the ideas of the designer, also that the combustion passage ought not to be an attenuated space, such not being conducive to efficiency, duration of walls, or conservation of heat. As the diameter of cylinder design increases, the power developed by the cylinder increases even more rapidly; and it is found that the limits of strength of material would require excessive or prohibitive diameter of crank shafts and pins if the two piston connections were placed on a single shaft without a bearing between them. The necessary length of such a bearing would usually entail so great separation of the cylinders that the combustion passage 30 would become so attenuated as to detract from the normal very high efficiency of the engine, if not indeed to destroy the possibility of continuous operation due to rapid deterioration of said passage.

The invention provides for getting these high efficiencies in large engines, and attains its other purposes by the mechanism now to be described.

The general idea of the invention is shown in Figs. 4 and 5; a particular simplified form, which is advantageous for many uses is shown in Figs. 1, 2 and 3; and various details of construction in other figures.

The simpler form will be first described. In Fig. 1 is seen the arrangement of a pair of cylinders 10, 20, belonging to the same power unit. As many of such pairs as are desired may be arranged along the parallel shafts 100 and 114, the number illustrated in the drawings being three, which is sufficient to show the principle and how it may be embodied in working constructions. It is evident from Fig. 1 that by this arrangement the cylinders 10 and 20 can be placed as close together as necessary for best design of the passage 30. The shafts 100 and 114 are connected together by any suitable mechanical means, that represented in the Figs. 1, 2 and 3 being a link 101 joining cranks on the two shafts, and another link 102 joining another pair of cranks set on the same shafts 90° apart from the first pair of cranks, so that the two shafts 100 and 114 always rotate synchronously. As represented in Figs. 1, 2 and 3 all of the power cylinders 10 are on the shaft 100, herein called the power shaft, and all of the air cylinders 20 are on the shaft 114, herein called the air shaft. A vertical shaft 36' driven by a jack shaft carries a cam 33° for driving the plungers 50 of three separate pumps, each of which is connected to one of the fuel injection nozzles 31. This shaft also carries a suitable governor 58 for controlling the amount of fuel delivered by each pump, a cam 33° for operating three starting valves, and, gearing at the top, driving a horizontal cam shaft 136 which runs along the successive power units parallel with the main shafting, and which has cams 133ᵃ for operating the air inlet valves 22, and cams 133ᵇ for controlling the intermediate air valves 24. The exhaust valves 12 are operated by cams 133ᵈ on another cam shaft 136" which is for convenience arranged on the other side of the engine parallel to the main shafting, and is driven from the jack shaft by a shaft 136''' set obliquely. The cams on the shaft 136 are double, the lobe of one-half being adapted to operate the valves in proper time when the engine is running in one direction and the lobe of the other half to operate them in proper time when the engine is running in the other direction. Either half is shifted into position by movement of the shaft 136 endwise, which may be done by lever 137 which has a fork 138 engaging in a grooved collar 139 fast on the shaft. The two halves of each cam are separated by a neutral space which facilitates the shifting. The cams 133ᵈ operating the exhaust valves may be likewise shifted.

The shift of angular position of the shafts, cranks and pistons with respect to each other, so that the air piston lags the proper amount when the direction of rotation of the main shaft has been reversed, is accomplished by the appliance illustrated in Figs. 1, 2, 6, 7, 8 and 13, on the shaft 114, connected with the main power shaft by the above described linkage, 101, 102. This provides for connection between shafts 100 and 114 in two different angular relations, one being the angular relation which is proper when the engine is running forward and the other that which is proper when the engine is running in the reverse direction.

The cranks on which links 101, 102 are pivoted are connected together by webs 100ᵇ, 114ᵇ, and the crank which is nearer to the air pistons has a hub 114' which can rotate a short distance on the shaft 114. It engages that shaft to drive it only as its pair of diametrically opposite lugs 105, 105 engage a similar pair of diametrically opposite lugs 104, 104, that project rigidly from shaft 114. Each of these lugs has front and rear faces adapted for such engagement; and these faces are so positioned with relation to each other and the other mechanism that the front face, which may be termed $a$, of lug 105 engages the face $a'$ of lug 104, the shafts 100 and 114, and their respective pistons, are in proper relation for forward driving. The space between the rear face of lug 105, which may be termed $b$, and the nearer face $b'$, of that lug 104 which is diametrically opposite the particular lug 104 with which the lug 105 is engaged, may be left open without in the least affecting the operation of the engine, because during the regular forward operation of the engine the drive is wholly in the forward direction of $a$ against $a'$, and there is never, (in the arrangement illustrated in Figs. 1, 2 and 3) any reversal of stress in this part of the mechanism. When the engine, having been brought to rest, is started in the opposite direction, so that the shaft 100 and hub 114' start in the opposite direction, the face $b$ is in the lead, and travels idly through the space until it engages the face $b'$ of the other lug 104. Upon such engagement it becomes a driving face rotating the shaft 114 in the reverse direction. However, owing to the lost motion traversed by the face $b$ at the beginning of the reversal, the angular relation of shaft 114 to the shaft 100 is different. The mechanism may be designed so that this difference is double the desired lag of the air piston. In such case, upon the reversal of direction the power cranks overtake the air cranks in the first 45° of their motion, and in the next 45° they travel ahead of them so that when the air pistons begin to be driven they are lagging 45° as is required. The reversal of the main shaft is accomplished by simply stopping the engine, shifting the cams by means of handle 137 and then starting the engine, in which case the cams will control it so that it starts in the opposite direction. The gears for driving the valve cams, pumps, etc., therefore are set on the end of the shaft 114 beyond the links as illustrated in Figs. 2 and 1, or, at least, are connected with the power shaft rather than with the air shaft.

The construction described makes an engine suitable for marine use,—particularly as compared with other engines, such as steam turbines, which are not reversible, and such as Diesel engines which would be at least twice as long as my engine, because the limitation of cylinder sizes would require twice as many cranks, or more, on the propeller shaft for equal power. And still other advantages are possible, by the arrangement shown in Figs. 4, 5 and 10.

In each power unit the air cylinder may be considered roughly as absorbing about ⅓ of the total power generated in the power cylinder. It is one feature of the invention to arrange some of the power cylinders with their cranks on the air shaft, as in Fig. 4, where there is one power cylinder 10 on the air shaft 114 for each three air cylinders on that shaft. The approximate power needed to operate the air pistons is generated on the very shaft to which they are connected; the balance of power transmitted from one shaft to the other is relatively small, and the mechanical efficiency of the engine is increased by the resulting elimination of friction. This is especially suitable for non-reversible engines.

If the engine is not to be reversible the air shaft power cylinders may be placed anywhere desired on the air shaft but preferably at one end. If it is to be made reversible, I prefer to arrange them together at one end of the air shaft, and to place lag-reversing mechanism of the general type above described on that shaft between the power cranks and the air cranks on that shaft. An arrangement applicable to that situation is illustrated in Fig. 12 which shows how reversal may be effected when air and power cylinders have their shafts on the same axial line.

In this case the links 101, 102 are supplanted by gears 106; and the lag-reversing mechanism has its lugs 104 rigid with one of the air shafts 114, 114ª, and lug 105 rigid with the gear. Each gear is rigid on one of the power shafts,—either on that part 114″ which has the two air cylinders or on the main shaft 100; which reversal is effected as before described.

In the special case of marine engines, where full power astern is not needed a still further simplification may be made, the nature of which is indicated in detail in Fig. 5. In this case there is only one lag-reversing mechanism and this is located between the air shaft 114 which may, for example, carry six air cranks as in Fig. 5, and a shaft 114″ in line with it carrying two power cranks.

Fig. 5 may be considered as a detailed showing of the arrangement of the three power units and their shafting connections seen at the right hand of Fig. 4, the positions which the cylinders would occupy if present being shown by the dotted lines. In this case the main power shaft 100 is continuous throughout the extent illustrated in the drawing. The main air shaft 114 as there seen is connected through the lag-reversing mechanism with the hub 114' which is fast on the shaft 114″ that carries two power cylinders in the same line with the shaft 114.

The power transmitted between the parallel power shafts is so small that the links 101' and 102' may have one of their ends pivoted on the same crank pin with one of the power cranks. On account of the lag of the air crank a web 107 has to be provided to join the other end of the link 101′ with the crank pin of the air piston, and a similar arrangement for the other end of the link 102′ and its adjacent air piston, but as the air crank is so much smaller than the power crank there is space for this. By this construction two cranks and the outboard additional bearings shown in Figs. 1, 2 and 3 are saved. It is however necessary to run the two airshaft power cylinders idle when the engine is reversed, because being connected unchangeably to the power cranks they will be in wrong angular relation when the engine runs in the opposite direction. This is easily provided for in the valve reversing mechanism by having cams that hold their various valves continuously open and their pumps inactive, so that their pistons travel idly.

In the arrangement illustrated in Figs. 1, 2 and 3, the reversal of shaft and crank relations is automatic, and this is possible because the power shaft is always driving the air shaft and there is never any reversal of stress on the lugs 104, 105, while the engine is running in either direction. The reversal of shaft relations in the engine illustrated in Figs. 4 and 5 may also be automatic; but if there be any reason to fear that such a reversal might occur, as in an engine where only a single air piston is driven through such a lag-reversing mechanism, or where it may be desired on general principles to safeguard against all unforeseen possibilities of any separation of the driving lug 105 from the driving lug 104 except when the engine is reversed, a further feature of the invention may be used, comprising means illustrated in detail in Figs. 5, 6, 7 and 8. This consists in the provision of a keeper 108, adapted to be inserted between the rear face of each driving lug and the leading face of the driven lug which is next behind it. When the keeper is in place, a reversal of stress cannot change the position of the parts, but the whole set, 105, 108, 104, 105, 108, 104, making a complete circle, revolve as a solid mass. This device may consist of a ring mounted loosely on the hub of the driven lugs 104 and having diametrically opposite lugs 108, 108, projecting from it between the lugs 104, 104. The looseness of mounting permits rotation of the ring for a few degrees forward or backward to engage either faces $a'$ or faces $b'$ and permits a short sliding of the ring in the direction of the axis. For the latter a lever or other means is provided, to be operated manually or by any suitable arrangement of auxiliary power, which lever has a fork 109 engaging in the groove 109′, so that it can push the ring in axial direction against compression springs 109″ far enough for its lugs 108, 108, to clear the lugs 105, 105. When it is in that position the lugs 105 can rotate so that the lag is reversed as above explained; and the keeper lugs 108 can then be put into fresh spaces thus formed. The springs 109″ force it back whenever pressure on the lever is released. The lugs 108 of this keeper may preferably be sectors in shape, which are slightly wedge-shaped or pointed, in the axial direction, so as to enter easily between two lugs 104 and 105. In the operation of this part of the invention it is only necessary to push the keeper axially out of locking position by means of the lever, while the engine is coming to rest or while it is at rest, and to hold it out while the engine starts in the opposite direction. While it is out the lugs 104, 105 have the same freedom of movement with respect to each other as in the arrangement of Figs. 1, 2 and 3. While it is thus out the pressure of the lever on the keeper will keep it from rotating, as the engine starts, by friction imposed as by a brake shoe, until the lugs 105 have traveled their distance from $a$—$a'$ engagement to $b$—$b'$ engagement with lugs 104. In so doing the lugs 105 move into space from which the keeper lugs 108 were withdrawn, and then move on out of it, and being now engaged with the driven lugs 104, move them into engagement with the keeper lugs. Then the keeper can slip back again axially, with its lugs 108 tight between the lugs 104 and 105 in their new positions. This reëntrance is effected automatically by the springs 109″. The operator does not have to give any thought to the matter, if it be a hand-operated mechanism, except possibly to apply a dragging friction to the keeper to hold it from rotating until the spaces in the rotating mass get opposite its lugs. It cannot be held too long for the lugs 104 will carry it along in advance of them as soon as they encounter it.

In connection with this reversal of cranks any suitable means may be used for reversing the valves and the detailed showing of valves and valve controlling mechanism is merely to be considered as suggesting one means of doing that.

In a stationary or my non-reversible engine, or even in a marine engine where 90% or more of its operation is in one direction, the cylinders may be "offset" inwardly from the parallel planes passing through their crank shafts, so as to permit further shortening of the passages 30 connecting them. In this case the air cylinder should be offset somewhat more than the power cylinder as pointed out in my co-pending application Serial No. 8828.

Other modifications also may be made from the specific embodiment of the invention illustrated and described.

I claim as my invention:

1. An internal combustion engine comprising a multiplicity of power units, each having a power cylinder, air cylinder, short direct connecting passage, and pistons; parallel shafts; linkage connecting the shafts; and connections from the pistons to the shafts; the pistons of each pair being connected to different shafts, with the air piston lagging behind its power piston; and one of the power pistons being on the same shaft with an air piston.

2. In an internal combustion engine having a multiplicity of power units, each having a power cylinder and piston, an air cylinder with lagging piston, and parallel shafts; connections by which the power pistons drive the air pistons, including a pair of diametrically opposite driving lugs and a pair of diametrically opposite driven lugs, each lug in one pair being adapted to come into engagement with one lug of the other pair in one direction of rotation and into engagement with the other lug of said other pair in the other direction of rotation, with the same lag of driven pistons behind driving piston.

3. In an internal combustion engine having a multiplicity of power units, each having a power cylinder and piston, an air cylinder with lagging piston and parallel shafts; connections by which the power pistons drive the air pistons, including a driving lug adapted to engage a driven element in either direction of rotation, with lost motion between its two engaging positions, equal to the difference between its own thickness and double the angle of lag, and a block removably insertible beside driving lug, filling the space of said lost motion, thereby holding the parts in rigid position notwithstanding reversal of stress.

4. In an internal combustion engine having a multiplicity of power units, each having a power cylinder and piston, an air cylinder with lagging piston, and parallel shafts, connections by which the power pistons drive the air pistons, including a driving lug adapted to engage a driven element with the same lag in either direction of rotation and with lost motion between its two engaging positions; and a keeper adapted to hold the parts in engagement in either position.

5. An internal combustion engine, comprising a multiplicity of power units, each having a power cylinder, air cylinder and pistons; parallel shafts; linkage connecting the shafts; and connections from the pistons to the shafts; the pistons of each pair being connected to different shafts, with the air piston lagging behind its power piston; and two of the power pistons being on the same shaft with an air piston; the said linkage comprising connecting links journaled on one shaft on the same pin with a piston rod.

6. An internal combustion engine comprising a multiplicity of power units, each having a power cylinder, air cylinder and pistons; parallel shafts; linkage connecting the shafts; and connections from the pistons to the shafts; the pistons of each pair being connected to different shafts, with the air piston lagging behind its power piston; one of said shafts being formed in two sections, with lag-reversing mechanism coupling them together and with an air piston connected to one of said sections and power pistons connected to the other; the said linkage comprising connecting links each of which is journaled on the same pin with one of the piston rods to which a power piston is connected.

7. In an internal combustion engine having a multiplicity of power units, each having a power cylinder and piston, an air cylinder with lagging piston, and parallel shafts; connections by which the power pistons drive the air pistons, including means to reverse the direction of lag when the direction of rotation is reversed; there being on one of the shafts one or more power pistons and air pistons of such power and arrangement with respect to each other that the torque required for driving the air pistons on said shaft is at all times greater than the torque furnished by the power pistons thereon, thereby preventing reversal of stress in the means connecting the shafts.

Signed by me at Boston, Mass., this 15th day of February, 1915.

MERL R. WOLFARD.

Witnesses:
JOSEPH T. BRENNAN,
EVERETT E. KENT.